No. 770,580. PATENTED SEPT. 20, 1904.
E. G. HEWITT.
SUN DIAL.
APPLICATION FILED JUNE 16, 1904.

NO MODEL.

Witnesses:
Raphaël Netter
A. A. Dunham

Edward G. Hewitt, Inventor by Kerr, Page & Cooper Attys.

No. 770,580. Patented September 20, 1904.

UNITED STATES PATENT OFFICE.

EDWARD G. HEWITT, OF NEW YORK, N. Y.

SUN-DIAL.

SPECIFICATION forming part of Letters Patent No. 770,580, dated September 20, 1904.

Application filed June 16, 1904. Serial No. 212,777. (No model.)

*To all whom it may concern:*

Be it known that I, EDWARD G. HEWITT, a citizen of the United States, residing at New York, in the county of Kings and State of New York, have invented certain new and useful Improvements in Sun-Dials, of which the following is a specification, reference being had to the drawings accompanying and forming part of the same.

My invention relates to devices in the nature of sun-dials, and has for its object to provide an instrument of that kind which can also be used to ascertain the points of the compass.

The invention itself is simple and inexpensive to manufacture and easily manipulated by unskilled and inexperienced persons.

It consists in the novel features, combinations of elements, and arrangements of parts hereinafter described, and more particularly pointed out in the claims.

A convenient embodiment of the invention is typically illustrated in the accompanying drawings, in which—

Figure 1:
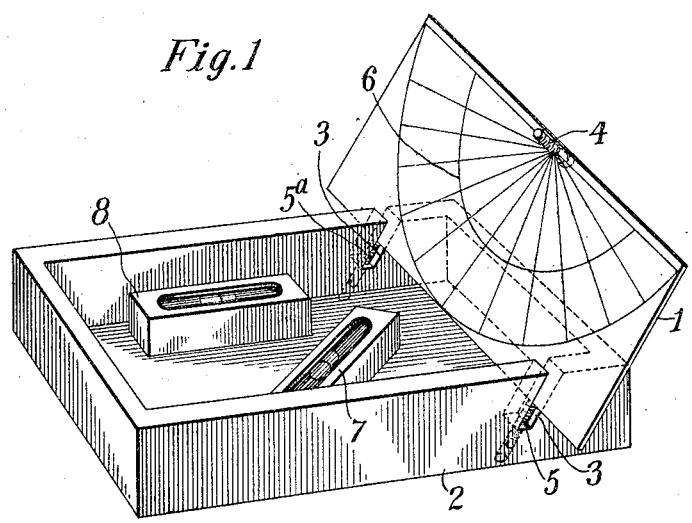
Figure 2:
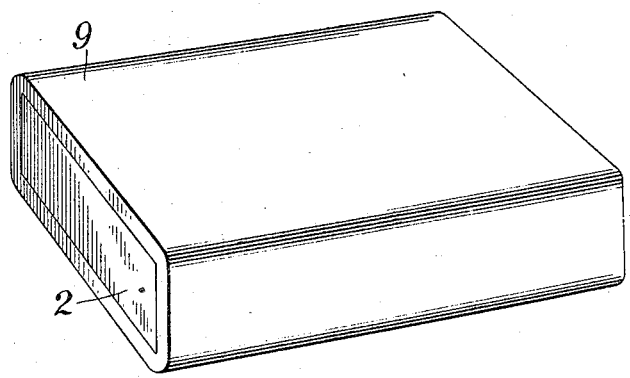

Figure 1 shows the device ready for use, and Fig. 2 the cover or case for the same when packed in the dial-support.

The device consists, essentially, of a dial or plate 1 and a suitable holder 2. The latter is preferably in the form of a shallow rectangular box having diagonal or inclined slots 3 in its sides near one end to support the dial. The dial is provided with an adjustable screw or gnomon 4, arranged perpendicular to the dial. The angle of the slots 3, with a plane perpendicular to the bottom of the holder or box 2, is the latitude of the locality in which the instrument is to be used, so that by arranging the device with the gnomon pointing north and the holder itself horizontal the shadow of the gnomon will indicate the hour on the graduated dial in the usual manner.

As is well known, solar time varies from day to day. This variation is called "equation of time" and must be allowed for when determining the time by means of an instrument which gives only actual solar time. In the present instrument I have provided means whereby this correction can be made in the device itself, so that by proper adjustment thereof the reading will be either mean solar time or "standard" time, as desired. The means referred to are the screws 5 $5^a$, extending through the bottom of the sides up into the slots, so that the dial rests on the same. By turning either or both screws the dial may be turned slightly about its gnomon as an axis. The result is that the graduations are thrown forward or backward relative to the shadow, as will be readily understood, thus subtracting or adding the fraction of an hour necessary to correct for equation of time. The amount of adjustment may be ascertained from tables in the almanac, or a table may be provided on the holder or case from which the data required may be at once found. When so adjusted, the reading of the device will be mean solar time. By tilting the dial more or less the reading may be made that of a standard meridian, as will be readily understood.

For the purpose of ascertaining the north and south line a circle 6 is provided on the dial about the gnomon as a center at a convenient distance therefrom. The gnomon itself is adjustable vertically by screwing it in or out of the dial, so that the angle between the plane of the dial and a line drawn from the top of the gnomon to any point in the circumference 6 may be made the declination of the sun for the given day of the year. Then by arranging the device relative to the sun in such a manner, the holder 2 being held level, that the shadow of the gnomon terminates on the circumference 6 the instrument will have been brought into the meridian, as desired. The height of the gnomon above the dial depends, of course, upon the sun's declination and the radius of the circle 6. The latter being constant, a table showing the heights of the gnomon for selected days of the year may be easily calculated and printed on the case or holder or dial if it is not desired to make the calculation each time the device is used. In adjusting the gnomon its height may be roughly measured by a rule and the adjustment completed by turning the gnomon one or more turns or fractions of turns. For example, if the gnomon has fifty threads to the inch a half-turn will raise or lower it one one-hundredth of an inch. Thus suppose that on a certain day the gnomon should be .55 of an inch to make shadow terminate in the circumference of the declination-circle when the instrument is in the meridian. The gnomon is set by rule one-half inch above the dial and then given two and one-half turns more, thereby raising it .05 of an inch farther.

For the purpose of leveling the instrument a pair of spirit-levels 7 8 may be provided, either permanently arranged in the holder at right angles to each other or loosely laid therein and arranged at each observation by the user.

When not in use, the dial may be removed from the supporting-slots, stowed in the holder, and the whole then protected by a slip-cover 9 or other suitable case. The instrument is then in convenient shape for carrying in the pocket.

It is not expected, considering the manner of using the device, that observations and readings therefrom will be extremely accurate; but with care in adjustment and handling reasonable approximations may be obtained.

The invention of course may be embodied in other forms, and I therefore do not consider myself limited to that herein specifically shown; but

What I claim is—

1. In a device of the kind described, the combination of a slotted, box-like holder, the slots being arranged at an angle corresponding to a given latitude, a dial removably supported in the slots, a gnomon carried by the dial, and means for effecting partial rotation of the dial in its own plane, as set forth.

2. In a device of the kind described, the combination of a slotted holder, a dial supported in the slots, a gnomon carried by the dial, and a screw penetrating into one of the slots in line therewith and bearing on the dial, whereby the latter may be partially rotated in its own plane, as set forth.

3. In a device of the kind described, the combination of a box-like holder having slotted walls, the slots being arranged at an angle corresponding to a given latitude, and screws penetrating the slots in line therewith and bearing on the dial, whereby the latter may be partially rotated in its own plane, as set forth.

4. In a device of the kind described, the combination of a holder, a dial supported thereby, a gnomon carried by the dial, said gnomon being adjustable in height relative to the dial, and a declination-circle on the dial about the gnomon as a center, as set forth.

5. In a device of the kind described, the combination of a box-like holder having slotted walls, a dial removably supported in the slots, screws penetrating the slots and bearing on the dial, whereby the latter may be partially rotated in its own plane, a gnomon carried by the dial, said gnomon being adjustable in height relative to the dial, and a declination-circle on the dial about the gnomon as a center, as set forth.

EDWARD G. HEWITT.

Witnesses:
S. S. Dunham,
A. E. Mahan.